Figure 1:
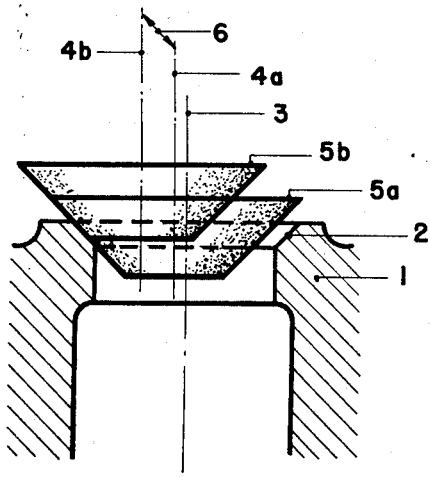

Dec. 19, 1950 W. ROSSMANITH 2,534,531
MACHINE FOR GRINDING INTERNAL CONE SURFACES
Filed Dec. 15, 1945

INVENTOR
WOLFGANG ROSSMANITH
BY
HIS ATTY

Patented Dec. 19, 1950

2,534,531

UNITED STATES PATENT OFFICE 2,534,531

MACHINE FOR GRINDING INTERNAL CONE SURFACES

Wolfgang Rossmanith, Solothurn, Switzerland

Application December 15, 1945, Serial No. 635,274
In Switzerland November 8, 1945

1 Claim. (Cl. 51—43)

This invention relates to a machine for grinding internal cone surfaces. In the machines hitherto in use, for grinding internal cone surfaces with stationary work piece, a grinding wheel in the cone shape of the hollow cone which is to be ground, is employed, which wheel, during grinding, comes into contact with its whole circumferential surface with the entire surface of the hollow cone.

By this process it is not possible to obtain precise and clean-ground internal cone surfaces.

When greater demands are made for surface quality and precision, it has hitherto been the practice to grind the internal cone surfaces by means of an internal grinding machine with rotating work piece according to the usual hole grinding process.

In such process the grinding wheel is at any given time in contact with the work piece only with one line of its circumferential surface, and the grinding wheel performs during grinding a longitudinal movement along the surface which is to be ground.

It is an object of the present invention to provide a machine for grinding internal cone surfaces, which renders it possible to apply the same process which is carried out by internal grinding machines with rotating work piece, for grinding holes with stationary work piece.

The following arrangement has been made for carrying out this process with stationary work piece; the grinding spindle is placed in the bore of a hollow spindle which rotates round its own axis. The axes of the grinding spindle and hollow spindle lie in one plane. In this plane the axis of the grinding spindle is displaced parallel to itself in a direction which is inclined through an angle to the hollow spindle axis, which angle is equal to half the angle at the point of the hollow cone which is to be ground. It is best to arrange the grinding spindle axis parallel to the hollow spindle axis. The grinding wheel is then cone shaped and has the same cone angle as the hollow cone.

The displacement of the grinding spindle in the hollow spindle is limited, to the effect that the axes of both spindles cannot coincide and that consequently the grinding wheel cannot come into contact in its entire circumference with the work piece, but is in contact with the internal cone surface which is to be ground, only with one line of its circumference. By displacing the grinding spindle inside the rotating hollow spindle in the manner stated, a displacement of the grinding wheel along the cone surface which is to be ground, is effected. The conditions for a grinding process as in normal internal grinding are therefore fulfilled.

The displacement of the grinding spindle in the hollow spindle is suitably effected automatically by means of an appropriate drive.

The approach of the grinding wheel to the work piece and the adjustment in grinding is effected either by axial displacement of the hollow spindle in the head stock, or by displacement of the whole head stock.

Figure 2:
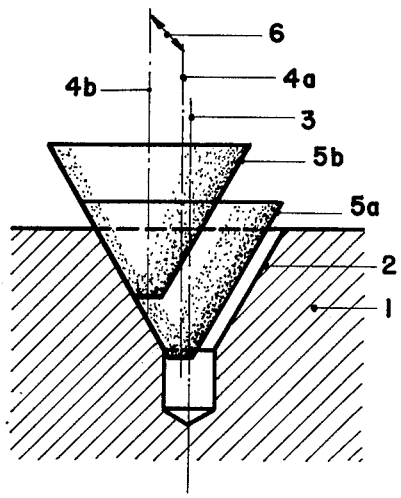
Figure 3:
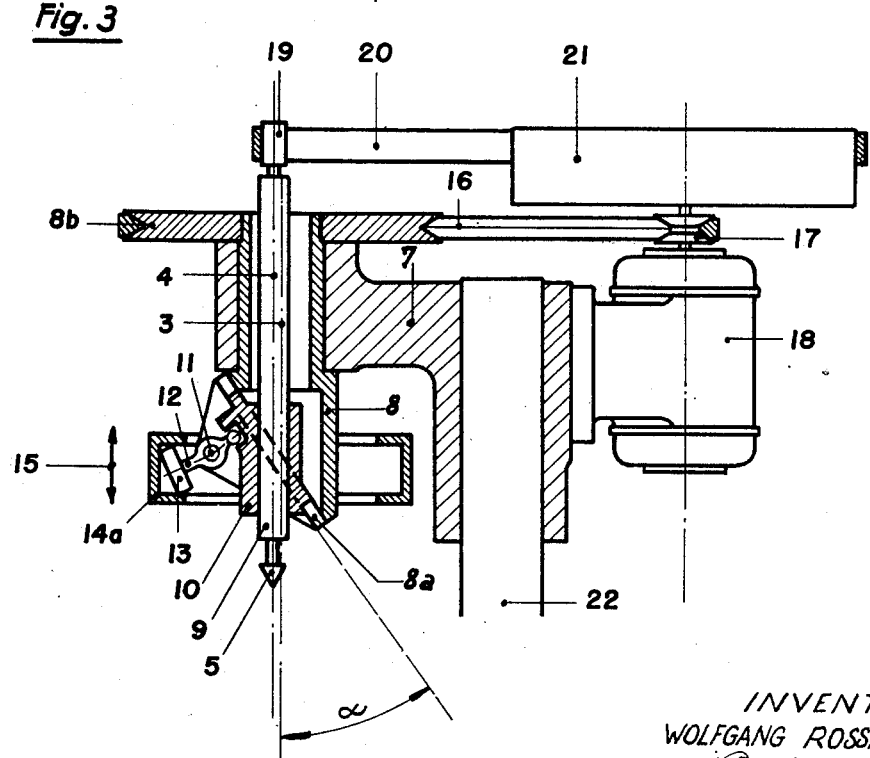

In the drawing:

Figs. 1 and 2 are diagrammatic illustrations of the grinding process employed in two frequently occurring cases, for grinding internal cone surfaces with stationary work piece, Fig. 1 showing the axial section through a cone shaped valve seat and Fig. 2 showing the axial section through a counter-sunk hole. Fig. 3 is a somewhat diagrammatic sectional view of a specific embodiment of the invention. 1 is the stationary work piece with the internal cone surface 2 which is to be ground. 3 is the axis of this hollow cone and at the same time rotation axis of the hollow spindle. Around this axis grinding spindle 4 rotates while its position constantly changes by a to and fro movement in direction 6. 5 is the cone shaped grinding wheel. 4a and 4b are two different positions of the grinding spindle axis. 5a and 5b are the corresponding positions of the grinding wheel.

7 is the head stock in which hollow spindle 8 is placed rotatable around its axis 3 but not longitudinally slidable. The lower, free borne end of the hollow spindle is provided with prism guide 8a which is inclined through angle α against hollow spindle axis 3. Angle α corresponds to half the angle at the point of the hollow cone which is to be ground. In the prism guide of the hollow spindle slide 10 which carries grinding spindle 9 is placed slidably. 5 is the cone shaped grinding wheel, 4 the axis of the grinding spindle. In the free borne part of the hollow spindle, bolt 11 is fixed, upon which double-arm lever 12 is placed rotatably. This lever engages with one end in a groove of the grinding spindle slide 10, while the other end carries a roller 13 which is inserted into the ring shaped groove of ring 14. Lever 12 therefore duplicates the rotating movement of the hollow spindle, while roller 13 rotates in the groove of ring 14. When ring 14 is moved up and down, in the direction of arrow 15, lever 12 is swung by roller 13 whereby slide 10 with grinding spindle 9 is moved to and fro in the prism guide 8a of the hollow spindle. The up and down movement of ring 14 may be effected either by hand, or better automatically by means of a separate driving device from the motor.

Hollow spindle 8 carries at its upper end a pulley 8b which is driven by means of a belt 16 from pulley 17 on motor 18. Driving pulley 19 of the grinding spindle is driven by belt 20 from pulley 21 on the motor. A tautening roller device—not shown in the drawing—causes belt 20 to remain permanently taut during the displacements of the grinding spindle in the hollow spindle.

In the embodiment shown in Fig. 3 the motor is fixed directly on head stock 7. For approaching the grinding wheel to the work piece and for adjusting when grinding, the entire head stock with the motor is moved by hand up and down on a guide 22 of the machine frame by means of a device not shown in the drawing.

What I claim is:

A machine for grinding hollow cone surfaces comprising a frame member, a hollow spindle rotatably supported within said frame, a grinding spindle rotatable within said hollow spindle and being axially and radially displaceable therein, said grinding spindle having a conical grinding member and being reciprocatingly supported within said hollow spindle, said hollow spindle having an enlarged chamber at its lower end and a guiding means in said chamber arranged at an angle to the axis of said hollow spindle, the angle being equal to one half the cone angle of said grinding member; a spindle slide fixed to said grinding spindle and being vertically reciprocable within said chamber, said slide being guided by said guiding means to cause axial displacement of said grinding spindle; a ring member positioned around said hollow spindle for reciprocable movement along the axis of the hollow spindle, a crank lever pivoted on said hollow spindle having one arm engaging said spindle slide and another arm rotatably supported in said ring, whereby vertical reciprocating movement of said ring causes said lever to swing on its pivot and cause corresponding reciprocation of said slide and grinding spindle, said reciprocation causing axial displacement of said slide and spindle along said guiding means.

WOLFGANG ROSSMANITH.

REFERENCES CITED

The following references are of record in the file of this patent:

UNITED STATES PATENTS

| Number | Name | Date |
| --- | --- | --- |
| 753,911 | Pelstring et al. | Mar. 8, 1904 |
| 1,656,388 | Nielsen | Jan. 17, 1928 |
| 1,662,137 | Summers | Mar. 13, 1928 |
| 1,948,792 | Lee | Feb. 27, 1934 |
| 1,995,027 | Glassford | Mar. 19, 1935 |
| 2,139,896 | Johnson | Dec. 13, 1938 |

FOREIGN PATENTS

| Number | Country | Date |
| --- | --- | --- |
| 401,540 | Great Britain | Nov. 16, 1933 |
| 513,474 | Great Britain | Oct. 13, 1939 |